US012320109B2

(12) United States Patent
Johnson et al.

(10) Patent No.: US 12,320,109 B2
(45) Date of Patent: Jun. 3, 2025

(54) TOILET FRESHENER AND NIGHTLIGHT

(71) Applicant: Homemation, Inc., Sandy, UT (US)

(72) Inventors: Bryce Johnson, Sandy, UT (US); Ryan Relyea, Sandy, UT (US)

(73) Assignee: Homemation, Inc., Sandy, UT (US)

( * ) Notice: Subject to any disclaimer, the term of this patent is extended or adjusted under 35 U.S.C. 154(b) by 95 days.

(21) Appl. No.: 17/947,757

(22) Filed: Sep. 19, 2022

(65) Prior Publication Data

US 2023/0086582 A1 Mar. 23, 2023

Related U.S. Application Data

(60) Provisional application No. 63/246,717, filed on Sep. 21, 2021.

(51) Int. Cl.

| | |
|---|---|
| ***E03D 9/00*** | (2006.01) |
| ***A47K 13/30*** | (2006.01) |
| ***F21V 23/04*** | (2006.01) |
| ***F21V 33/00*** | (2006.01) |
| ***F21W 131/30*** | (2006.01) |

(52) U.S. Cl.

CPC .............. *E03D 9/007* (2013.01); *A47K 13/30* (2013.01); *F21V 23/0464* (2013.01); *F21V 23/0471* (2013.01); *F21V 33/004* (2013.01); *F21W 2131/30* (2013.01)

(58) Field of Classification Search

CPC ........... E03D 9/005; E03D 9/032; E03D 9/03; A47K 17/00

See application file for complete search history.

(56) References Cited

U.S. PATENT DOCUMENTS

| | | | |
|---|---|---|---|
| 4,327,451 | A | 5/1982 | Baus |
| 4,630,322 | A | 12/1986 | Kuo |
| 5,031,252 | A | 7/1991 | Oyama |
| 5,136,476 | A | 8/1992 | Horn |
| 5,377,363 | A | 1/1995 | Shieh |
| 6,098,211 | A | 8/2000 | Ehrensperger et al. |
| 6,457,435 | B1 | 10/2002 | Bridges |
| 7,603,257 | B1 | 10/2009 | Sawalski et al. |
| 8,261,377 | B2 | 9/2012 | Oh |
| 8,359,679 | B2 | 1/2013 | Richard et al. |

(Continued)

FOREIGN PATENT DOCUMENTS

| | | |
|---|---|---|
| CN | 2307844 | 2/1999 |
| CN | 2713029 | 7/2005 |

(Continued)

OTHER PUBLICATIONS

International Search Report and Written Opinion, PCT/US22/44047, Feb. 17, 2023.

*Primary Examiner* — Christine J Skubinna

(74) *Attorney, Agent, or Firm* — BATEMAN IP; Randall B. Bateman

(57) ABSTRACT

A toilet freshener and nightlight may include a flexible arm for attaching a body to a toilet bowel. The body may include a catch for selectively holding a fragrance dispensing container within the body. The body may also include a speaker for emitting white or pink noise or noise canceling waveforms. The toilet freshener may also include a transceiver to communicate with an application run on a mobile processor for allowing remote control of the toilet freshener and nightlight.

26 Claims, 18 Drawing Sheets

(56) References Cited

U.S. PATENT DOCUMENTS

| | | | |
|---|---|---|---|
| 8,387,617 B1 * | 3/2013 | Robinson | A61M 15/009 128/203.12 |
| 8,603,257 B2 | 12/2013 | Burt et al. | |
| 8,966,676 B2 | 3/2015 | Hamakita et al. | |
| 9,375,745 B2 | 6/2016 | Finch | |
| 9,702,132 B2 * | 7/2017 | Chimene | F21V 33/004 |
| 9,702,133 B2 | 7/2017 | Hornsby et al. | |
| 9,757,486 B2 | 9/2017 | Dobrinsky et al. | |
| D823,429 S | 7/2018 | Wood et al. | |
| 10,370,837 B2 | 8/2019 | Wood et al. | |
| 10,378,194 B2 | 8/2019 | Wood et al. | |
| 10,626,588 B2 | 4/2020 | Wood et al. | |
| 10,633,846 B2 | 4/2020 | Wood et al. | |
| 10,633,847 B2 | 4/2020 | Wood et al. | |
| D991,427 S | 7/2023 | Johnson et al. | |
| D1,008,036 S | 12/2023 | Johnson et al. | |
| 2004/0199985 A1 | 10/2004 | Wilson et al. | |
| 2009/0249533 A1 | 10/2009 | Sawalski et al. | |
| 2010/0031982 A1 | 2/2010 | Hornsby et al. | |
| 2010/0205728 A1 | 8/2010 | Muhlhausen et al. | |
| 2010/0205731 A1 | 8/2010 | Muhlhausen et al. | |
| 2010/0243776 A1 | 9/2010 | Forster | |
| 2011/0088153 A1 | 4/2011 | Richard et al. | |
| 2012/0266920 A1 * | 10/2012 | Burt | E03D 9/032 4/224 |
| 2013/0025038 A1 | 1/2013 | Frey et al. | |
| 2014/0304903 A1 * | 10/2014 | Cogswell | E03D 9/052 4/314 |
| 2016/0045675 A1 * | 2/2016 | Cammish | A61M 5/31555 604/207 |
| 2017/0251893 A1 | 9/2017 | Wink et al. | |
| 2018/0087254 A1 | 3/2018 | Lloyd | |
| 2018/0223515 A1 * | 8/2018 | Wood | E03D 9/005 |
| 2019/0209806 A1 * | 7/2019 | Allen | H04L 12/2829 |
| 2020/0002929 A1 | 1/2020 | Sonovani | |
| 2022/0243441 A1 * | 8/2022 | Eyal | B05B 11/0089 |

FOREIGN PATENT DOCUMENTS

| | | | |
|---|---|---|---|
| CN | 2761716 | 3/2006 | |
| CN | 2761717 | 3/2006 | |
| CN | 2765955 | 3/2006 | |
| CN | 2765956 | 3/2006 | |
| CN | 2765957 | 3/2006 | |
| CN | 2775158 | 4/2006 | |
| CN | 2782797 Y | 5/2006 | |
| CN | 2784483 Y | 5/2006 | |
| CN | 2786212 | 6/2006 | |
| CN | 2796628 | 7/2006 | |
| CN | 2910086 Y | 6/2007 | |
| CN | 201087471 | 7/2008 | |
| CN | 1755055 B | 10/2010 | |
| CN | 202017245 | 10/2011 | |
| CN | 101736794 B | 11/2011 | |
| CN | 202139666 | 2/2012 | |
| CN | 204155099 | 2/2015 | |
| CN | 104644045 A | 5/2015 | |
| CN | 204995346 | 1/2016 | |
| CN | 105649159 | 6/2016 | |
| CN | 106368279 | 2/2017 | |
| CN | 206467740 | 2/2017 | |
| CN | 106522329 A | 3/2017 | |
| CN | 206294707 | 7/2017 | |
| CN | 206477413 | 9/2017 | |
| CN | 206554209 U | 10/2017 | |
| CN | 206571202 | 10/2017 | |
| EP | 2657415 | 10/2013 | |
| FR | 2907813 | 5/2008 | |
| JP | 2000096676 | 4/2000 | |
| JP | 2001227026 | 8/2001 | |
| JP | 2005344300 | 12/2005 | |
| JP | 2007209642 | 8/2007 | |
| JP | 2014163162 | 8/2007 | |
| JP | 2008174957 | 7/2008 | |
| JP | 2012082615 | 4/2012 | |
| JP | 2012149512 | 8/2012 | |
| JP | 2012202102 | 10/2012 | |
| JP | 2013079578 | 5/2013 | |
| JP | 2013155595 | 8/2013 | |
| JP | 2016037702 | 3/2016 | |
| JP | 2016044400 | 4/2016 | |
| JP | 2016094712 | 5/2016 | |
| JP | 2017160653 | 9/2017 | |
| JP | 2020117267 | 8/2020 | |
| KE | 2020117267 A * | 8/2020 | B65B 31/003 |
| KR | 101729571 | 5/2017 | |
| TW | 201008538 | 3/2010 | |
| TW | M451469 | 4/2013 | |
| WO | 2016079914 | 5/2016 | |
| WO | 2016157859 | 10/2016 | |
| WO | 2016208175 | 12/2016 | |
| WO | 2017169221 | 10/2017 | |
| WO | 2017169222 | 10/2017 | |
| WO | 2017169223 | 10/2017 | |
| WO | 2017169224 | 10/2017 | |
| WO | 2017169227 | 10/2017 | |

* cited by examiner

TOILET FRESHENER AND NIGHTLIGHT

BACKGROUND

Field of the Art

The present invention relates to a toilet freshener which may have a nightlight for improving the user experience of a person using a toilet.

State of Art

Using a toilet is a ubiquitous experience in the developed and developing world. While it is an activity which all people need to engage in multiple times a day, there are a variety of circumstances which can make going to the bathroom uncomfortable. Often when having a bowel movement the smell of the feces or gasses which are emitted during the process can be unpleasant and at times overwhelming. This can cause embarrassment for the person who leaves a bathroom smelling bad and can be a very unpleasant experience for someone using the same bathroom shortly thereafter. This is particularly embarrassing in the context of an office bathroom—where coworkers likely saw who used the bathroom last—or at parties where a number of people may be waiting to use the only restroom in someone's home that is near common areas like a living room, deck, pool, etc. Even if the smell is not out of the norm, it may be embarrassing to someone having a lot of or loud flatulence while using the bathroom.

Another common negative user experience related to using the toilet is doing so at night. While most people have to use the restroom occasionally during the night, other people, such as women who are pregnant and men who have prostrate problems, may need to go to the bathroom multiple times during the night. During the daytime, a person would ordinarily turn on the light as they enter the bathroom. However, at night most people prefer not to turn on the main light both because their eyes are more sensitive to light and because turning on a bright light will make it harder to go back to sleep. A user may also wish to avoid awaking others who may be disturbed by a light turning on.

To avoid the eye strain and being more fully awakened, many people will enter the bathroom and attempt to use the bathroom based on whatever ambient light is available. While this is sometimes successful, doing so can also cause an only partially awake person to urinate and either hit the toilet seat or miss the toilet bowl altogether. If the person needs to sit on the toilet, a misjudgment due to lack of lighting can cause the person to sit on the toilet bowl if the seat has been left up, sit on the toilet seat cover if the seat cover has been left down, or to miss the toilet altogether, potentially resulting in injury.

Numerous attempts have been made to address these issues. Fragrance dispensers have been developed which periodically dispense fragrance into the room. Some systems pass incoming toilet water through a fragrance container so that the new water in the toilet is scented.

Other devices such as GLOWBOWL and ILLUMIBOWL provide a motion activated light which lightens the interior of the toilet bowl so it can be better seen at night. The motion sensor, however, can be blocked and may limit the lightening of the toilet bowl at night. Additionally, the toilet seat cover can obstruct the lighting.

Still other devices have attempted to solve both problems. U.S. Pat. No. 10,633,847, teaches a self-contained toilet bowl dispenser and light which activates a light when a person is sensed and emits fragrance onto the water when it detects that person has sat down on the toilet.

While all of the devices are better than simply guessing where the toilet is at night and going without odor control, each has disadvantages. The currently available lighting mechanisms may not detect a user coming from multiple directions. Some restrooms have two doors so that they can be accessed from either of adjoining rooms. If the motion sensor is on one side of the toilet, the person coming from that direction may activate the light, while a person coming from the opposite side might not. Likewise, some individuals do not like to have a light, housing, etc., disposed on the visible side of the toilet and prefer to have such devices displaced as discretely as possible. This can result in the motion sensor being obscured and lessen the ability to reliably determine when a person is approaching the bathroom.

Still another problem is the ability of a fragrance dispenser attaching to the side of toilet bowls having different widths.

Similarly, automated dispensing of fragrance may also cause problems. Many people are allergic to fragrance and may not wish to have the system activate while using, or as soon as they are done using, the toilet. Additionally, those who use the bathroom frequently, such as pregnant women and men having prostate issues may not want the bathroom being overwhelmed with fragrance from repeated activation of the device where most visits are urination and unlikely to result in significant mal odors. Thus, there is a need for an improved fragrance dispenser and light.

SUMMARY OF THE INVENTION

The following summary of the present disclosure is not intended to describe each illustrated embodiment or every possible implementation of the invention, but rather to give illustrative examples of application of principles of the invention.

One or more of the above-referenced matters may be addressed in a toilet freshener and nightlight. It will be appreciated that multiple inventive features are present and that one or more of the inventive features may be used independent of any other inventive features and that the discussion of the features in combination with one another does not require them to be included unless specifically set forth in the claims.

One or more embodiment of the present disclosure may include a body which holds a supply of fragrance and an arm attached to the body for dispensing the fragrance adjacent or into a toilet bowl. It should be understood that the term fragrance is used herein broadly and is intended to cover material, which is used to perfume, mask or cover odors and is thus intended to cover fragrances, essential oils, and other non-hydrophobic oils which inhibit odors passing out of water, deodorants and the like.

In one or more embodiments of the present disclosure the arm may be flexible to allow the users to bend the arm as needed for holding the arm and body to a toilet. The arm may include, but is not limited to, one or more bendable metal wires to help the arm hold the shape into which the arm has been bent for mounting on the toilet.

One or more embodiments of the present disclosure may have a fragrance dispensing container which mechanically engages the body when the fragrance dispensing container is inserted thereinto to ensure that the fragrance dispensing container is properly seated and to prevent the fragrance container from falling out. This may include, for example, a notch or projection which engages a retainer, pawl or catch in the body to secure the fragrance dispensing container in place.

One or more embodiments of the present disclosure may also include a release which is disposed in communication with the retainer to release the retainer from engagement with the fragrance container. One or more embodiments may also include a projection on the fragrance dispensing container which is disposed adjacent the release so that as the release is engaged, a user may engage the projection to withdraw the fragrance dispensing container from the body.

One or more embodiments of the present disclosure may include a fragrance dispensing container which includes a pump attached thereto or formed therein so that the pump is inserted into and removed from the body with the fragrance dispensing container.

One or more embodiments of the present disclosure may include an actuator disposed in the body which selectively engages the pump on the fragrance dispensing container to selectively release fragrance.

One or more embodiments of the present disclosure may include a valve disposed within the actuator for preventing back flow of fragrance through the actuator.

One or more embodiment of the present disclosure may include a dose counter for determining the number of times the pump has been activated and determining and communicating when the fragrance dispensing container needs to be replaced. This may include memory built into the container so that the count is independent of power loss or the container being moved from one fragrance dispenser to another.

One or more embodiments of the present disclosure may include a motion sensor disposed on the top of at least one of the body and the arm in a location that the sensor is not covered if a toilet seat and toilet seat cover are down in order to activate a nightlight regardless of the direction a person is coming from and the location of the toilet freshener on the toilet seat.

One or more embodiments of the present disclosure may include a first light disposed on the body or the arm in a position which is outside the outside lateral edges of the toilet seat when mounted on the toilet and a second light which is disposed inside the toilet bowl of the toilet seat.

One or more embodiments of the present disclosure may include a switch for selectively controlling when fragrance is released. In one embodiment the switch may move between automatic and manual so that a person can determine each time he or she uses the bathroom whether or not fragrance is released.

One or more embodiments may have a switch which allows the person using the toilet to delay the application of the fragrance. Thus, for example, a person may select to have the fragrance emitted 30 or 60 seconds after standing up from the toilet so that the person has the ability to leave the immediate vicinity of the toilet before the fragrance is sprayed. Likewise, the fragrance dispenser may also have hysteresis before the sensor will trigger another person sitting on the toilet.

One or more of the embodiments may have sensor which determines when a person sits on the toilet and activates in response thereto to spray fragrance into the toilet bowl. The sensor may detect whether the toilet seat has a person sitting thereon of whether the toilet seat cover is closed so as to prevent spraying of fragrance simply because someone closes the toilet seat cover.

One or more embodiments of the present disclosure may include a wireless communication protocol for transmitting the number of doses which has been dispensed to a remote processor to enable replacement of a fragrance dispensing container which is running low.

One or more embodiments of the present disclosure may include an application which can send and receive wireless communication from the toilet freshener and nightlight.

In one or more embodiments, the application may be able to send signals to a toilet freshener and nightlight to change the function thereof. For example, a person who is allergic to fragrance may have an application on their phone which sends a Bluetooth or other wireless communication signal to the toilet freshener telling the toilet freshener not to activate the next time it senses a person sitting down, or to delay activation for some period of time. Rather than activating while the person is sitting, the device may activate one minute after the device detects that the person is no longer on the toilet to allow the person to wash their hands and leave the bathroom before the fragrance is dispensed.

One or more embodiments may utilize a fragrance dispensing container which contains pills or tablets which are dropped into water in the toilet bowl to thereby dissolve a tablet which provides fragrance or otherwise masks odor is or around the toilet.

One or more embodiments may utilize a dispenser cartridge which holds plurality of tablets which may be selectively attachable to the arm of the dispenser and reside inside the toilet bowl during use. The cartridge may communicate with other parts of the dispenser to dispense tablets in response to and indication that a person has sat on the toilet. Thus, for example the dispenser may contain batteries for power and sensors for activating a sensor to determine whether a person has sat on the toilet and may have a snap connection to the dispenser cartridge. Alternatively the cartridge may be a self-contained unit which performs all of the functions relative to sensing use of the toilet and dispensing one or more tablets in response thereto.

One or more embodiments may have a speaker located in the toilet freshener so as to emit white noise, pink noise, or noise canceling sound waves when a person is using the toilet so as to muffle any sounds associated with using the restroom, such as flatulence. Alternatively, the toilet freshener could send such signals to an external speaker.

One or more embodiments may include a control mechanism, such as a switch or an application which allows the user to determine whether white noise, pink noise or noise-canceling sounds should be emitted.

These and other aspects of the present invention are realized in a toilet freshener/nightlight which includes one or more of the above-referenced features of the present disclosure.

BRIEF DESCRIPTION OF THE DRAWINGS

Various embodiments of the present disclosure are shown and described in reference to the numbered drawings wherein.

Figure 1:
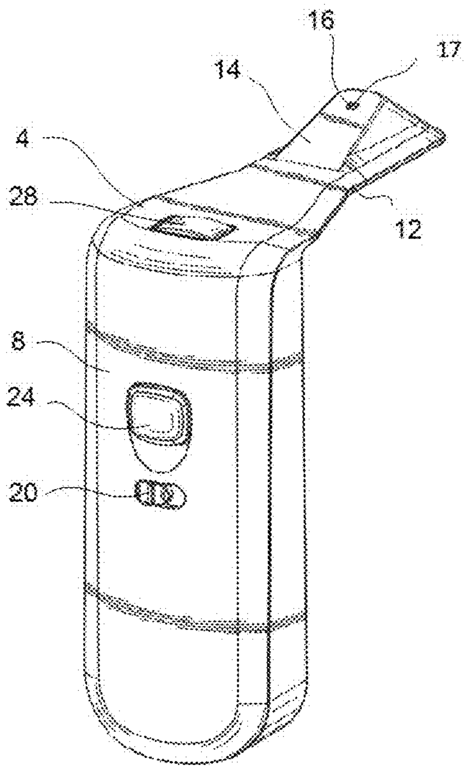
FIG. 1 shows a front perspective view of a toilet freshener and nightlight.

It will be appreciated that the drawings are illustrative and not limiting of the scope of the invention which is defined by the appended claims. The embodiments shown accomplish various aspects and objects of the invention. It will be appreciated that it is not possible to clearly show each element and aspect of the present disclosure in a single figure, and as such, multiple figures are presented to separately illustrate the various details of different aspects of the invention in greater clarity. Similarly, not all configurations or embodiments described herein or covered by the appended claims will include all the aspects of the present disclosure as discussed above.

DETAILED DESCRIPTION

Various aspects of the invention and accompanying drawings will now be discussed in reference to the numerals provided therein so as to enable one skilled in the art to practice the present invention. The skilled artisan will understand, however, that the apparatus and methods described below can be practiced without employing these specific details, or that they can be used for purposes other than those described herein. Indeed, they can be modified and can be used in conjunction with products and techniques known to those of skill in the art in light of the present disclosure. The drawings and the descriptions thereof are intended to be exemplary of various aspects of examples of the invention and are not intended to narrow the scope of the appended claims. Furthermore, it will be appreciated that the drawings may show aspects of the invention in isolation and the elements in one figure may be used in conjunction with elements shown in other figures, etc.

Reference in the specification to “one embodiment,” “one configuration,” “an embodiment,” or “a configuration” means that a particular feature, structure, or characteristic described in connection with the embodiment may be included in at least one embodiment, etc., but need not be included in any particular embodiment. The appearances of the phrase “in one embodiment” in various places may not necessarily limit the inclusion of a particular element of the invention to a single embodiment, rather the element may be included in other or all embodiments discussed herein.

Furthermore, the described features, structures, or characteristics of embodiments of the present disclosure may be combined in any suitable manner in one or more embodiments. In the following description, numerous specific details may be provided, such as examples of products or manufacturing techniques that may be used, to provide a thorough understanding of embodiments of the invention. One skilled in the relevant art will recognize, however, that embodiments discussed in the disclosure may be practiced without one or more of the specific details, or with other methods, components, materials, and so forth. In other instances, well-known structures, materials, or operations may not be shown or described in detail to avoid obscuring aspects of the invention.

Before the present invention is disclosed and described in detail, it should be understood that the present invention is not limited to any particular structures, process steps, or materials discussed or disclosed herein, but is extended to include equivalents thereof as would be recognized by those of ordinary skill in the relevant art. More specifically, the invention is defined by the terms set forth in the claims. It should also be understood that terminology contained herein is used for the purpose of describing particular aspects of the invention only and is not intended to limit the invention to the aspects or embodiments shown unless expressly indicated as such. Likewise, the discussion of any particular aspect of the invention is not to be understood as a requirement that such aspect is required to be present apart from an express inclusion of that aspect in the claims.

It should also be noted that, as used in this specification and the appended claims, singular forms such as “a,” “an,” and “the” may include the plural unless the context clearly dictates otherwise. Thus, for example, reference to “a bracket” may include an embodiment having one or more of such brackets, and reference to “the plate” may include reference to one or more of such plates.

As used herein, the term “substantially” refers to the complete or nearly complete extent or degree of an action, characteristic, property, state, structure, item, or result to function as indicated. For example, an object that is “substantially” enclosed would mean that the object is either completely enclosed or nearly completely enclosed. The exact allowable degree of deviation from absolute completeness may in some cases depend on the specific context, such that enclosing the nearly all of the length of a lumen would be substantially enclosed, even if the distal end of the structure enclosing the lumen had a slit or channel formed along a portion thereof. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

As used herein, the term "generally" refers to something that has characteristics of a quality without being exactly that quality. For example, a structure said to be generally vertical would be more vertical than horizontal, i.e., would extend greater than 45 degrees from horizontal. Likewise, something said to be generally circular may be rounded like an oval but need not have a consistent diameter in every direction.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Figure 2:
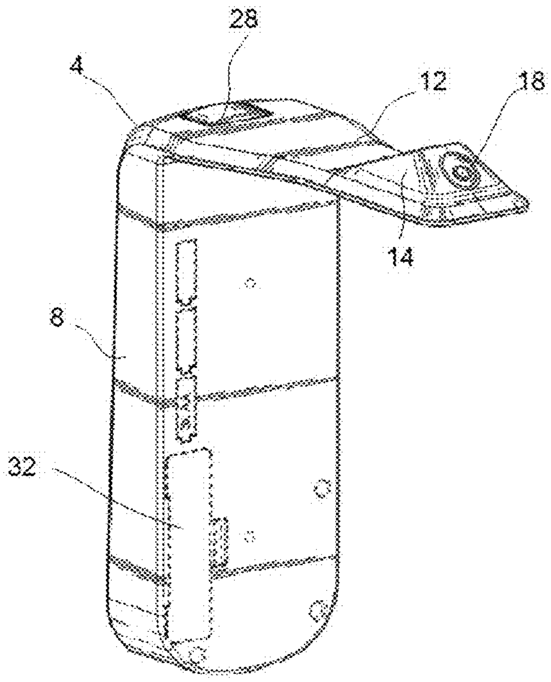
FIG. 2 shows a rear perspective view of the toilet freshener and nightlight of FIG. 1.

Turning now to FIGS. 1 and 2, there is shown perspective front and rear views of a toilet freshener and nightlight 4. The toilet freshener and nightlight 4 includes a housing having a body 8 and an arm 12 which extends away from the body. As will be explained in additional detail below, the arm 12 may include a projection 14 which may include a light 16, a sensor 17, and a fragrance spray nozzle 18 which forms a dispenser opening. The light 16 can be used to light the interior of a toilet bowl once activated to help a person using the toilet in low ambient light conditions. The sensor 17 may be used to determine when a person has sat on the toilet seat. This may be done by emitted and detecting reflected signals—such as is commonly done with ultrasonic transducers. Sensor 17 may also function based on the amount of light reflected from the light 16. Other methods of detection which may be used include, but are not limited to heat, sound, ambient light, pressure, capacitive touch and change in resistance.

The fragrance spray nozzle 18 may be disposed for dispensing fragrance, such as by spraying fragrance into the toilet bowl. This may be done upon receipt of a signal indicating that the sensor 17 has detected a person sitting on the toilet seat, or may be done simply based on a predetermined time from when one or more sensors detect that a person has entered the bathroom.

The body 8 may include a control switch 20. The control switch 20 may be used to switch the body between an automatic mode and a manual mode so as to provide a user with the ability to dispense fragrance each time the toilet is used, or to only dispense fragrance when the user presses the control switch.

Also disposed on the body 8 may be a light 24. The light 24 may be provided to partially light the bathroom at night so that a user need not turn on the bathroom light when using the toilet. This can be accomplished via a sensor 28 which may be disposed on the top of the body 8. The sensor 28 may include a motion detector which turns on the light 24 when a person is detected within a certain proximity, e.g., 5 feet of the toilet. The sensor 28 may also include an ambient light sensor so that the light 24 is not activated when the bathroom has adequate ambient light to facilitate use of the toilet without supplemental lighting.

The sensor 28 may be disposed on the top of the body 8 in such a position that the sensor will not be covered or materially shielded by a toilet seat or toilet seat cover. This enables the sensor 28 to activate the light 24 in response to a person approaching the toilet from multiple directions. It also facilitates proper use of the light 24 even when a user elects to place their toilet freshener and nightlight 4 toward the rear of the toilet bowl. While there are other nightlights that will enlighten a toilet bowl or provide room lighting when the bathroom is otherwise dark, such nightlights typically have the motion sensor disposed on the side of the body portion where it can easily be obscured by the toilet bowl, a toilet paper dispenser, a garbage can, etc.

Turning now to FIG. 2 specifically, a battery port 32 may be provided to allow a number of batteries to be inserted into the body so as to power the functions of the toilet freshener and nightlight 4. This allows a user to replace the batteries as necessary. It will be appreciated that power consumption with a toilet freshener and nightlight 4 may vary significantly based on a variety of factors. The toiler freshener and nightlight 4 of a person who uses a particular toilet frequently, spends considerable time on the toilet, and enters and exists a bathroom frequently at night will consume power significantly more than a toilet freshener and nightlight which is disposed on a toilet in a rarely used guest bathroom.

Figure 3:
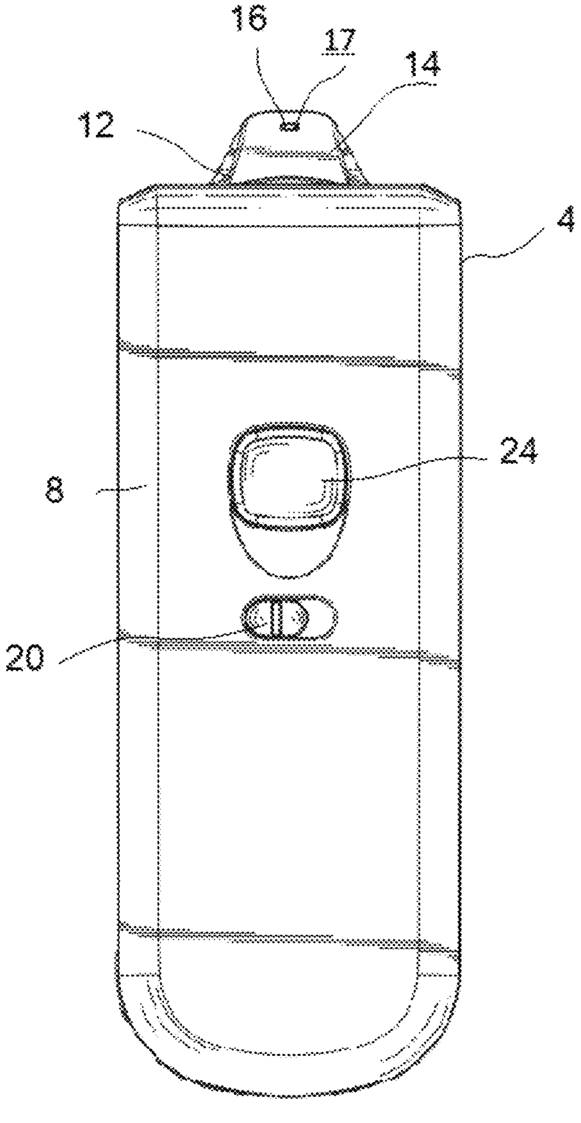
FIG. 3 shows a front view of the toiler freshener and nightlight of FIG. 1.
Figure 4:
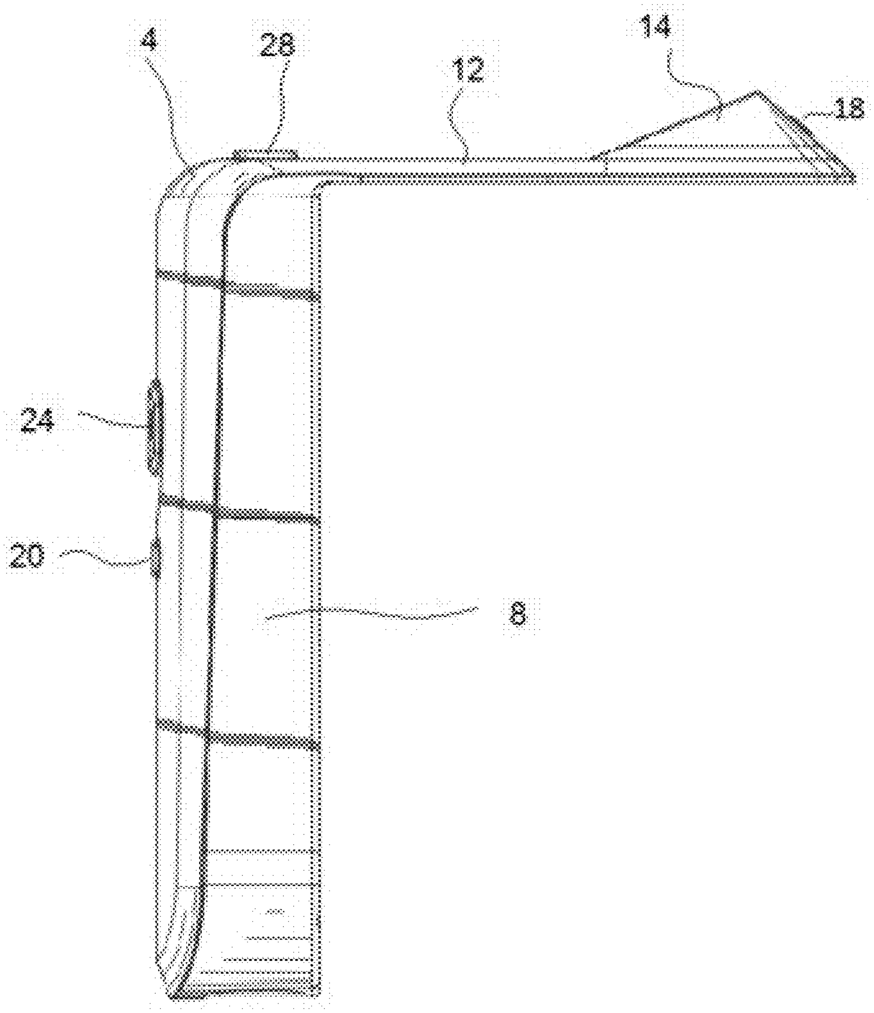
FIG. 4 show a first side view of the toilet freshener and nightlight of FIG. 1.
Figure 5:
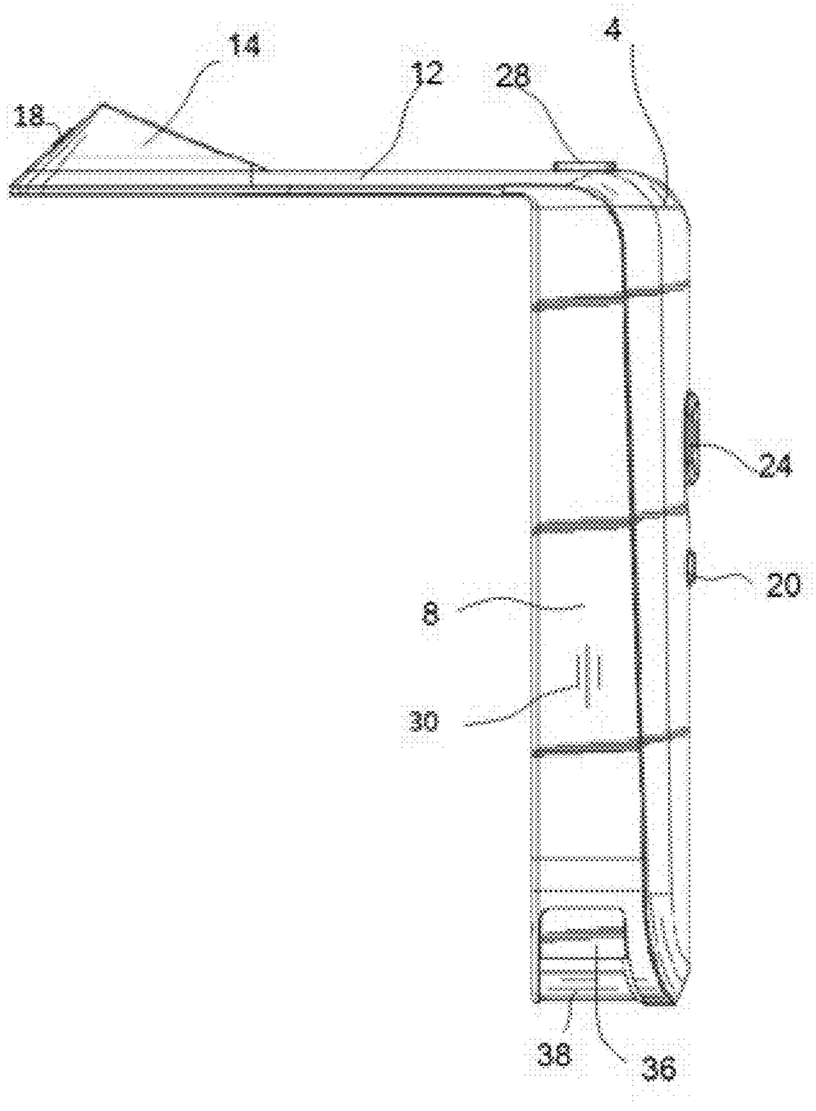
FIG. 5 shows an opposing side view of the toilet freshener and nightlight of FIG. 1.

FIGS. 3 through 5 show a front view and opposing side views of the toilet freshener and nightlight 4. Each shows the body portion 8, arm 12, projection 14, control switch 20, light 24 and sensor 28. Light 16 and sensor 17 can be seen in FIG. 3, and the spray nozzle 18 can be seen in FIGS. 4 and 5. As shown in FIG. 5, the toilet freshener and nightlight 4 may include a release 36 of a pawl or catch mechanism discussed below, and the bottom of a fragrance dispensing container 38. The release 36 allows the fragrance dispensing container 38 to be removed from the body 8 when desired, while keeping the fragrance dispensing container 38 securely held in the body 8 at other times.

FIG. 5 also shows a speaker opening 30 in the side of the body 8. The speaker opening covers a speaker which may emit noise to help muffle sounds often associated with flatulence. For example a person at a party may have drunk too many carbonated beverages and may have a significant amount of gas which is expelled when they use the bathroom. This can be fairly embarrassing if multiple people are waiting to use the bathroom—just as lingering odors can also be embarrassing. To this end, white or pink noise or noise canceling waveforms may be emitted through the speaker opening to muffle such sounds.

Figure 6:
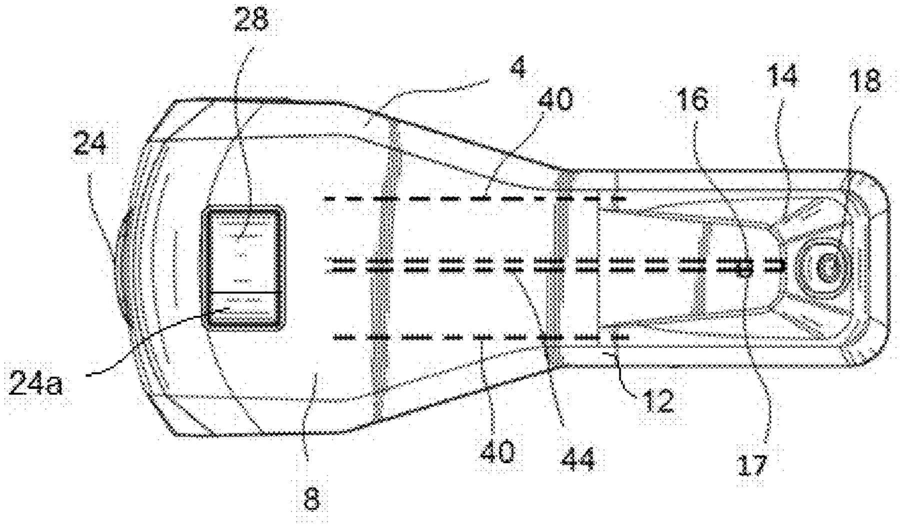
FIG. 6 shows a top view of the toilet freshener and nightlight of FIG. 1.

FIG. 6 shows a top view of the toilet freshener 4. In accordance with one aspect of the present disclosure, the arm 12 may be flexible so that the arm may be bent to accommodate toilets having different widths of the flange around the bowl to properly hold the toilet freshener and nightlight 4 to the toilet bowl. The arm may be formed with one or more bendable wires 40 covered by a flexible housing. A flexible fragrance tube 44 may also be disposed in arm 12 connected to the spray nozzle 18.

FIG. 6 also shows the sensor 28. The sensor 28 may be positioned at the top of the body 8 to ensure a broader area in which it can detect movement and turn on the light 24 and other functions of the toiler freshener when a person is detected. While discussed above as the light 24 being disposed on the side of the body 8, it will be appreciated that a light 24*a* may be disposed within or adjacent to the sensor 28 to make the light more visible from all angles.

Figure 7:
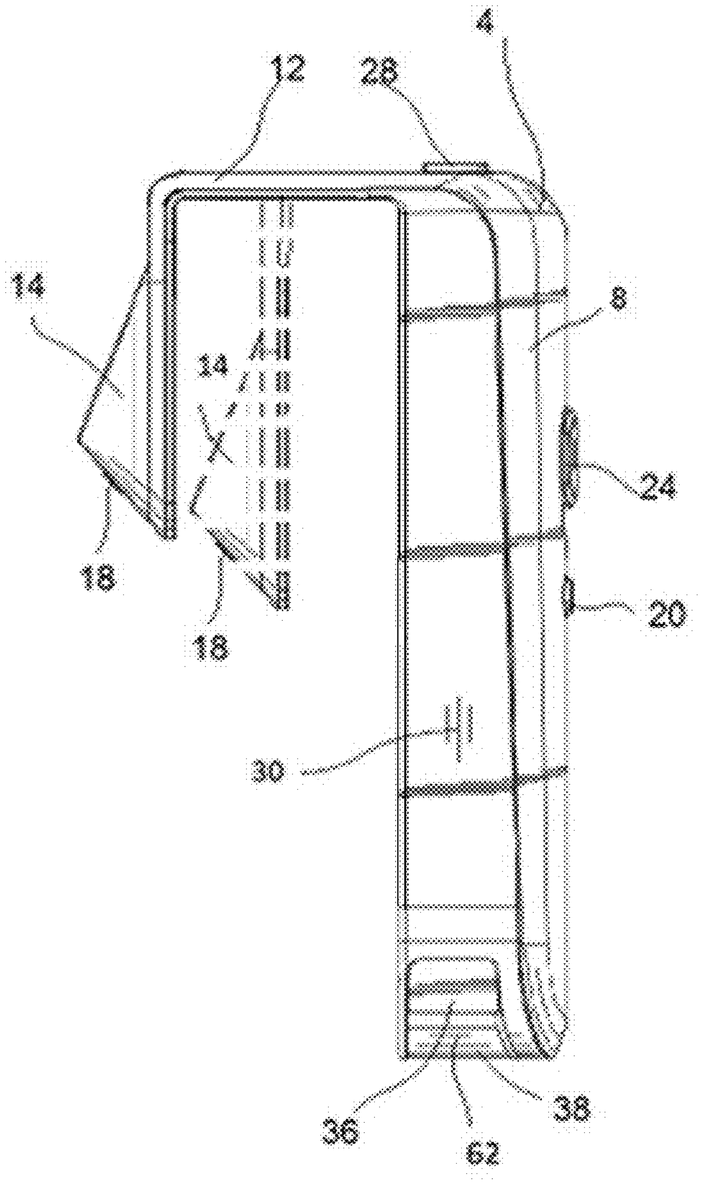
FIG. 7 shows a side view of the toilet freshener and nightlight of FIG. 1 with the arm bent for securing the toilet freshener and nightlight on a toilet.

FIG. 7 shows toilet freshener with the arm 12 bent into a first configuration to hold the body 8 onto a toilet, and a second configuration, represented by the dashed lines, in which the arm is able to hold the body to a toilet bowl having a much narrower rim. Thus, the arm 12 can be mounted on a variety of different toilet bowls or on different locations along a toilet bowl based on the desire of the user and the user may shape the arm as needed for proper mounting on the desired toilet bowl. The bend also positions the spray nozzle 18 to spray fragrance inside the toilet bowl—typically on the water surface. However, due to the flexible nature of the arm 12, the projection 14 may be disposed generally parallel to the body 8 as shown in FIG. 7. Alternatively, the arm 12 could be bent so that the part of the harm holding the projection 14 slopes away from or toward the body to control where the spray nozzle 18 directs the fragrance.

Figure 8:
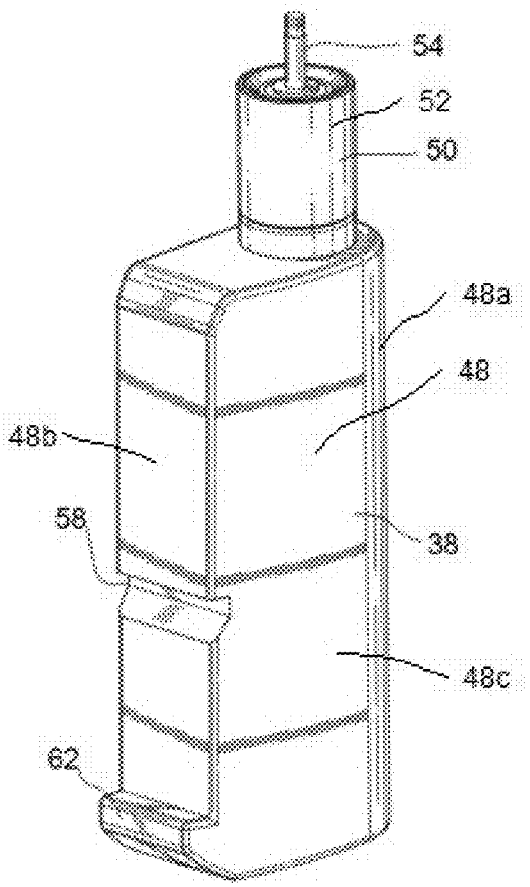
FIGS. 8 and 9 show front and rear perspective views of a fragrance dispensing container.
Figure 9:
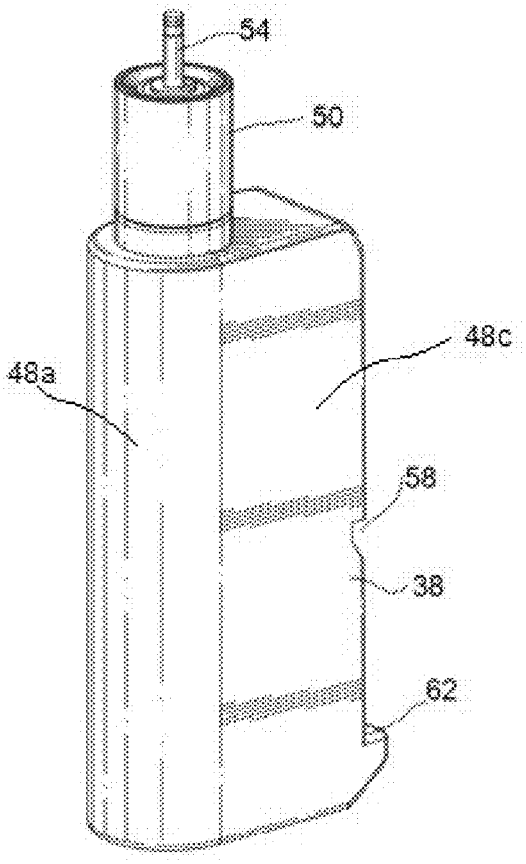
Figure 19:
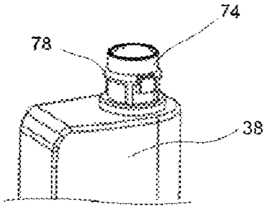
FIG. 19 shows a view of the top of the fragrance container with the pump mechanism removed.

Turning now to FIGS. 8 and 9, there are shown front and rear perspective views of a fragrance dispensing container 38. The fragrance dispensing container 38 may include a container body 48 which may have a closed bottom end (FIG. 14) and an opening in the upper end (FIG. 19) with a pump mechanism 50 disposed in the opening. A shroud closure 52 and piston 54 of the pump mechanism 50 is visible above the container body 48.

The container body may be curved on one end 48*a* and generally flat on an opposing end 48*b* and may have generally flat sidewalls 48*c* therebetween. Disposed in a sidewall 48*c* or end wall 48*a* or 48*b* of the container body 48 may be a channel or notch 58 which may extend inwardly into a void within the container body so as to leave a channel in the exterior wall of the container body. Also disposed along a sidewall or end wall of the fragrance dispensing container 38 may be a projection 62 extending outwardly. As shown in FIGS. 8-12, the protection 62 may disposed adjacent the bottom of the fragrance dispensing container 38 and positioned below the notch 58. As will be explained below, the notch 58 interacts with a pawl or catch to selectively prevent the fragrance dispensing container 38 from being withdrawn from the body 8 (FIGS. 1-7). The projection 62 facilitates removal of the fragrance dispensing container 38 from the body when it is time to replace the fragrance dispensing container as will be explained below.

Figure 10:
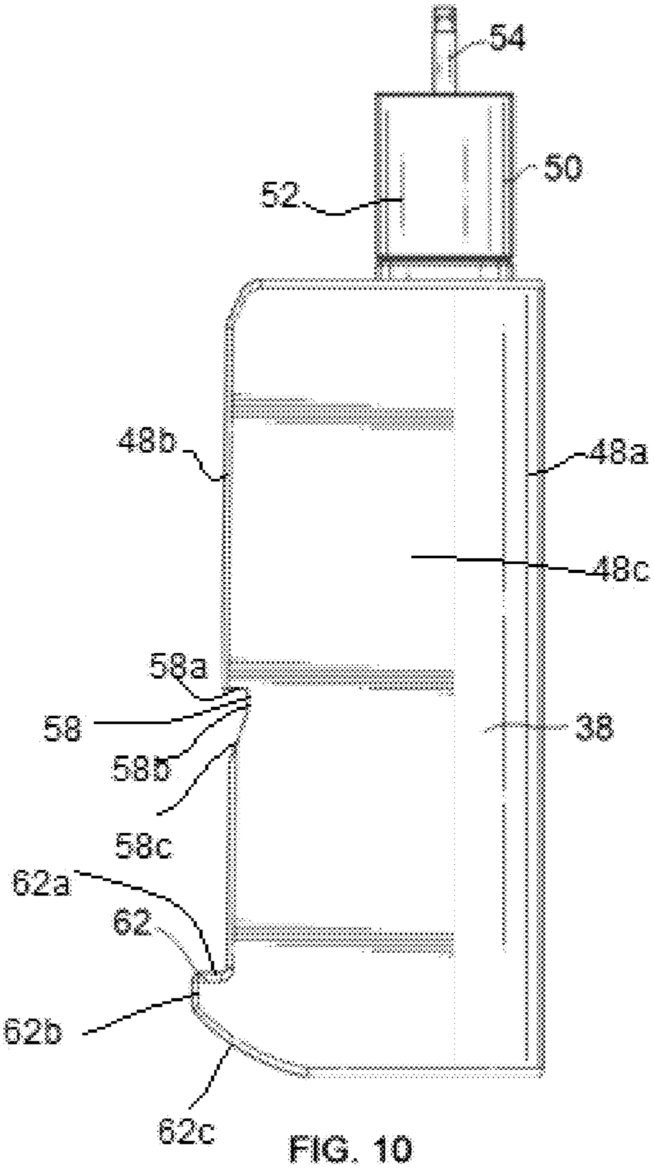
FIG. 10 shows a side view of the fragrance dispensing container of FIGS. 8 and 9.
Figure 11:
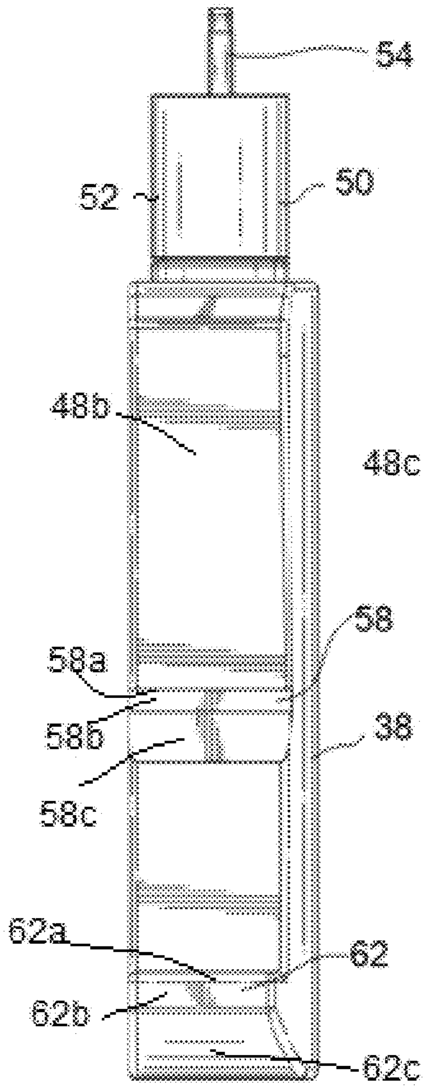
FIG. 11 shows an end view of the fragrance dispensing container of FIGS. 8 and 9.
Figure 12:
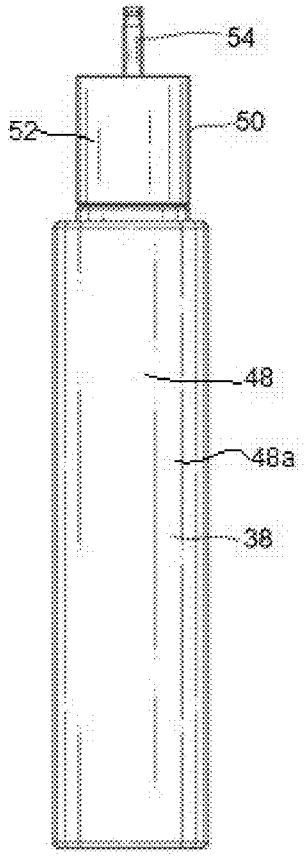
FIG. 12 shows an opposing end view of the fragrance dispensing container of FIGS. 8 and 9;'

As shown most clearly in FIG. 10, the notch 58 may have a generally horizontal top surface 58*a* which extends inwardly from the plane of the end wall of the fragrance dispensing container 38, and a vertically extending portion 58*b* extending downwardly from the top surface in an approximately perpendicular orientation to the top surface. A beveled surface 58*c* may extend from the vertical surface 58*a* and slopes outwardly toward the end wall 48*b* of the fragrance dispensing container.

The projection 62 near the bottom of the fragrance dispensing container 38 may be disposed on one of the end walls 48*a* or 48*b*, or one or more of the side walls 48*c* and may have a portion 62*a* which extends generally horizontally outwardly. The projection 62 may have a vertical portion 62*b* extending downwardly from the horizontally extending portion, and an arcuate portion 62*c* that curves as it approaches the bottom with a curvature that roughly matches that of the lower portion of the body 8 shown in FIGS. 1 through 7.

The symmetry between the bottom of the fragrance dispensing container 38 and the lower portion of the body 8 helps to prevent the fragrance dispensing container from being accidentally pulled out of the body, while the projection 62 allows the fragrance dispensing container to be easily removed from the body as soon as the release 36 (FIGS. 7, 22) has been pressed and downward pressure is placed on the projection. This can easily be done by the user's thumb or finger pressing in on the release 36 and then down on the projection 62 to remove the container body 48 from the body 8 while the pawl 106 is deflected out of the notch 58 as shown in FIG. 22.

Figure 13:
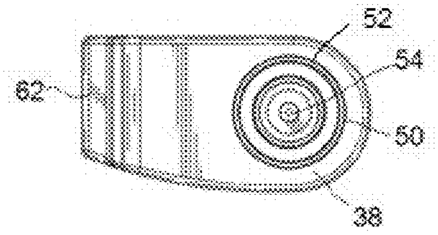
FIG. 13 shows a top view of the fragrance dispensing container of FIGS. 8 and 9.
Figure 14:
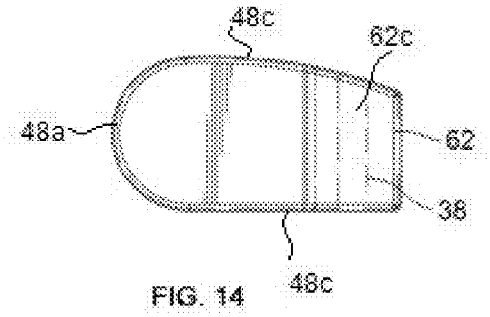
FIG. 14 shows a bottom view of the fragrance dispensing container of FIGS. 8 and 9.

FIG. 13 shows a top view of the container 38 and the pump mechanism 50. Also shown is that one or more of the sidewalls 48*c* may be curved. FIG. 14 shows a bottom view of the container body 48 with the projection 62 and the rounded portion 62*c*.

Figure 15:
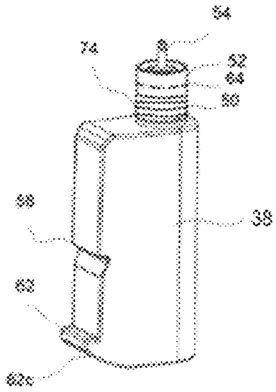
FIG. 15 shows a side view of one embodiment of the fragrance dispensing container.
Figure 16:
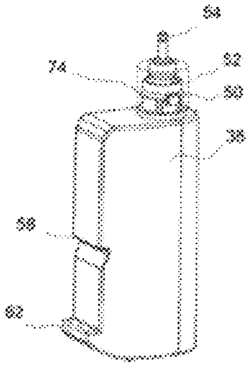
FIG. 16 shows a side view of an alternative embodiment of the fragrance dispensing container.
Figure 17:
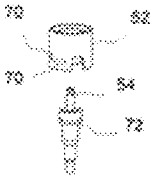
FIG. 17 shows an exploded view of a pump mechanism of the fragrance container.
Figure 18:
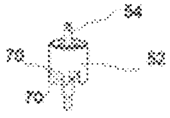
FIG. 18 shows an assembled view of the pump mechanism of the pump mechanism.
Figure 20:
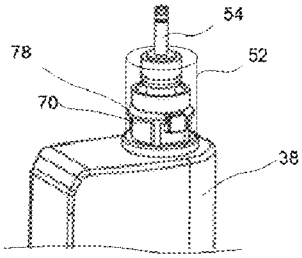
FIG. 20 shows a view of the top of the fragrance container with the pump mechanism installed.
Figure 21:
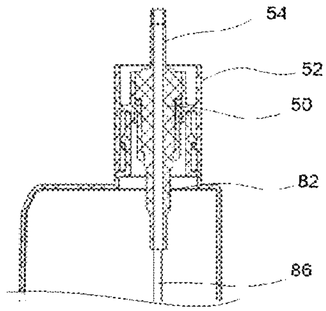
FIG. 21 shows a cross-sectional view of the top of the fragrance container and pump mechanism.

FIG. 15 shows one embodiment of the fragrance dispensing container 38 wherein the shroud closure 52 screws onto a threaded neck 74 to seat the pump mechanism 50 and hold it in place so that a grommet or O-ring seals the pump mechanism. FIG. 16 shows an alternate embodiment where in the shroud closure 52 is snap fit onto the neck 74. The shroud closure 52 may include a plurality of projections 70 (FIGS. 17 and 18) which slide over and then catch a flange 78 about the neck 74 of the fragrance dispensing container 38 to hold the spring body 72 in the neck of the fragrance dispensing container. To facilitate assembly, the flange 78 may include a bevel or chamfer (FIG. 19) to facilitate the projections 70 sliding over the flange and then engaging a horizontal ledge on the bottom of the flange to prevent removal of the shroud closure 52. The assembled pump mechanism 50 is shown in close-up in FIG. 20 and the internal components in cross-section in FIG. 21.

Figure 22:
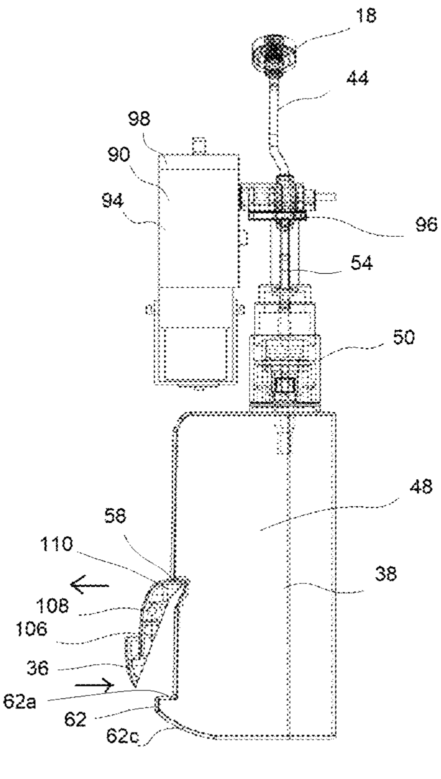
FIG. 22 shows a view of the fragrance container, a pump actuator, and a pump retention mechanism.

Turning now to FIG. 22 there is shown a view of the engagement between the fragrance dispensing container 38 and the various components inside the body 8 (FIGS. 1-7). Disposed adjacent the pump mechanism 50 is an actuator mechanism 90 which may include an actuator motor 94 and a transmitter or transceiver 98 for communicating signals to and from the actuator mechanism. When the actuator mechanism 90 receives a signal indicative of a person using a toilet, the actuator mechanism moves a plunger 96 into forceful engagement with the piston 54 of the pump mechanism 50. The plunger 96 may have a channel passing therethrough to allow fragrance passing through the plunger and into the fragrance tube 44, which conveys the fragrance material to the spray nozzle 18 and into the toilet bowl.

FIG. 22 also shows a pawl or catch 106 which may be used to hold the fragrance dispensing container 38 within the body. The catch 106 may have a pivot 108 which is spring-loaded to encourage an upper portion 110 of the catch inwardly. When a fragrance dispensing container 38 is slid into the bottom of the body 8 (FIGS. 1-7), the upper portion 110 of the catch 106 is biased to slide into the notch 58 in the fragrance dispensing container 38 when the fragrance dispensing container is properly seated. With the upper portion 110 engaged in notch 58, the fragrance dispensing container cannot be pulled out of the body.

The opposing end of the catch 106 may form the release 36 previously shown and discussed with respect to FIGS. 5 and 7. When in its resting position, the release 36 and the curved portion 62*c* along the bottom of the fragrance dispensing container 38 generally track the shape of the body 8 (FIG. 7). Pressing on the release 36 in the direction indicated by the arrow disposed near the bottom of the catch 106 causes the catch to rotate about the pivot 108 so that the upper portion 110 is moved outwardly and removed from the notch 58. The release 36 moves inwardly such that sliding the user's thumb or finger is positioned above the projection 62. Pressing downwardly after pushing in the release will cause the thumb or finger to engage the projection 62 and allow the user to pull the fragrance dispensing container 38 out of the body while the upper portion 110 of the pawl or catch 106 is removed from the notch 56 in the container 38. As soon as the release 36 is no longer being depressed, the catch 106 will rotate back to its resting position wherein it will engage the next fragrance dispensing container as it is advanced into body 8 and then nest in the notch 58. A clicking noise may be generated by the catch 106 moving into the notch 58—thereby advising the user that the fragrance dispensing container 38 is properly seated in the body.

Figure 23:
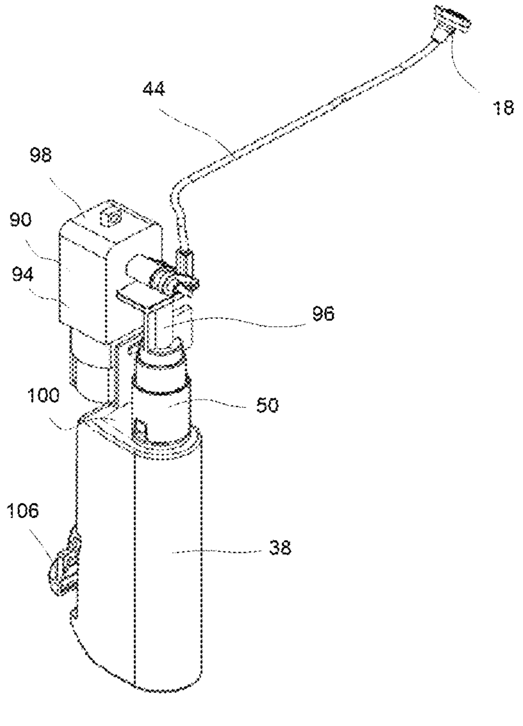
FIG. 23 shows a side view of the mechanisms shown in FIG. 22.

FIG. 23 shows the same structures as shown in FIG. 22 from a different angle and is numbered accordingly. FIGS. 22 and 23 also show a chip 100 disposed on the fragrance dispensing container 38. The chip 100 may include information as to the quantity of fragrance disposed in the fragrance dispensing container 38. The chip 100 may include a transmitter or transceiver which allows the chip to communicate with the actuation mechanism 90 disposed in the body of the toilet freshener and nightlight 4. As the number of available sprays of fragrance approaches zero, the chip 100 and the actuator mechanism 90 may communicate that the fragrance dispensing container 38 needs to be replaced. Thus, either the chip 100 or the actuation mechanism 90 communicate via a transmitter or transceiver to the user via a number of wireless communication protocols, such as Bluetooth, Wi-Fi, etc., or may be connected by a wire, etc. Alternatively, the chip 100 or the actuator mechanism 90 may communicate with other portions of the present freshener and nightlight 4 to advise the user that the fragrance dispensing container 38 needs to be replaced. In addition to wireless protocols, this could also be done by, for example, causing light 16 and or light 24 to flash so as to warn the user that the fragrance is nearly gone.

While the transceiver 98 of the actuator mechanism 90 may be used to communicate information to a user, either by human perceptible signals or wireless protocols in the use of some other process such as text messaging, email, or reporting information on an application sent to a smart phone, the transceiver 98 may also be used to receive instruction from a smart phone application or similar interface. All the body discussed above may include a control switch to regulate whether the actuator mechanism 90 actuates automatically or only in response to a user pressing a button, the transceiver 98 can also be used to modify actuator mechanism protocols. Thus, for example, a person may have an application for the toilet freshener and nightlight 4 on their smart phone. The application may be programmed to send a message to the actuator mechanism 90 to not activate for some period of time. This period of time may be adjustable, after which, the actuator mechanism 90 returns to its normal protocol.

While many people enjoy using a restroom which is scented so as to overcome typical bathroom odors, there are also people who are allergic to scents and can have difficulty breathing or other negative reactions when confronted with scents to which they are sensitive. The application may thus be programmed, for example to pause the actuator mechanism 90 for 2 to 3 minutes after receiving the signal. Such a pause will allow the person who has a fragrance allergy to use the toilet, wash their hands and leave the restroom before the actuator mechanism will dispense additional fragrance. The application may allow one or more repeats of the pause in the event that the user is in need of additional time to finish using the toilet. In such a manner, and application communicating with the actuator mechanism 90 enables a person suffering allergies to scents to temporarily overcome the actuator mechanism protocol, while still allowing the toilet freshener and nightlight to function normally the remainder of the time—thereby providing a more pleasant experience for all involved.

Figure 24:
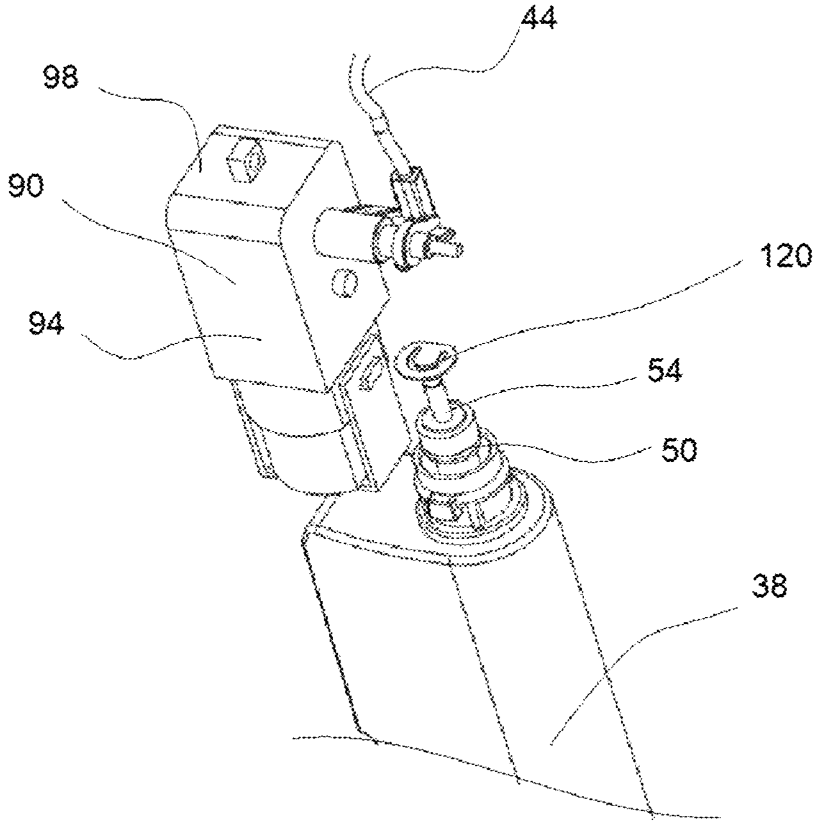
FIG. 24 shows a close-up perspective view of the actuator and fragrance container.

Turning now to FIG. 24, there is shown a close-up of the actuator mechanism 90, the pump mechanism 50 and the top of the fragrance dispensing container 38. The plunger of the actuator mechanism 90 has been removed to reveal a 1-way valve 120, such as a duck-bill valve or flap valve which allows fragrance solution emitted from the pump mechanism 50 to move away from the pump mechanism and through the fragrance tube 44 without dripping back down the piston 54.

Figure 25:
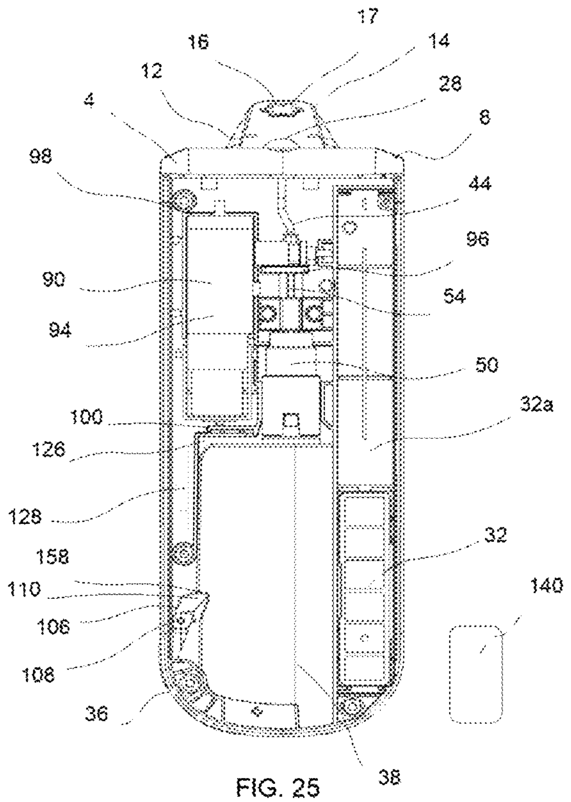
FIG. 25 shows a plan view of the body of the toilet freshener and nightlight.

FIG. 25 shows a plan view of the body 8 of the toilet freshener and nightlight 4 in accordance with the present disclosure. The light 16 and sensor 17 disposed on the projection 14 of the arm 12 are visible, as is the sensor 28 disposed on the top of the body 8. The lower end of the fragrance tube 44 extending upwardly from the plunger 96 of the actuation mechanism 90 disposed above piston 54 of the pump mechanism 50, which is mounted on the fragrance dispensing container 38 which is disposed in a void 126 formed in the body 8.

On the right side is the back of the battery port 32 and a battery chamber 32*a*. On the left side of the fragrance dispensing container 38 is the catch 106 with the upper end 110 disposed in the notch 58 in the end wall 48*b* of the fragrance dispensing container. Pressing on the release 36 will rotate the catch 106 about the pivot 108 so that the upper end 110 moves out of the notch 58.

Also disposed on the left side is a speaker 128 which may be disposed in communication with a signal generator 132 which may be a processor or other device for generating signals to the speaker. The speaker may emit white or pink noise to mask sounds which often occur when using the bathroom. Likewise, the speaker can be programmed to emit noise canceling waveforms. It will be appreciated that a single processor to be used to provide signals to the actuator mechanism, speaker, sensors, lights, etc., or that functional specific processors could be used. The toilet freshener and nightlight 4 may also communicate wirelessly with an external speaker 140

Figure 26:
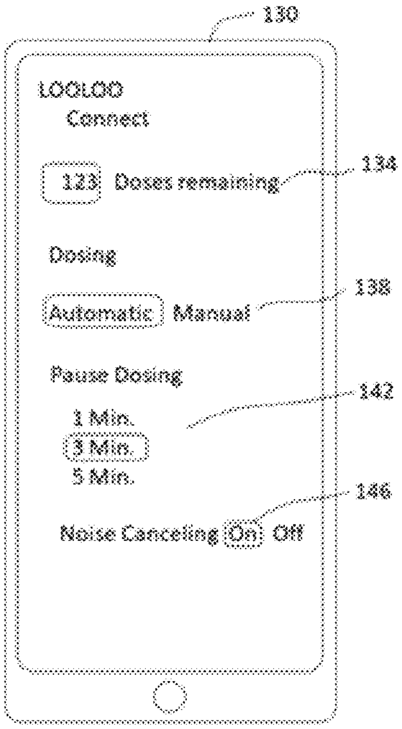
FIG. 26 shows a smart phone having an application for communicating with the toilet freshener and nightlight.

FIG. 26 shows a view of a smart phone 130 running an application for managing the toilet freshener and nightlight 4 shown in FIG. 25. The transceiver 98 of the actuation mechanism or the chip 100 can communicate with the application to identify the number of doses remaining in the fragrance dispensing container 38, as indicated at 134. If desired, the application maybe programmed to automatically order a new fragrance dispensing container 38 when the doses left falls below some predetermined threshold.

The application may also allow a user to switch their toilet freshener and nightlight 4 between the automatic and manual mode as indicated at 138. The application may also allow the user to temporarily pause the dosing to allow a person with allergies, etc., to use the restroom and leave before any dose of fragrance may be sprayed into the toilet bowl. The application may also enable the user to turn noise canceling or white/pink noise off or on as indicated at 146.

Figure 27:
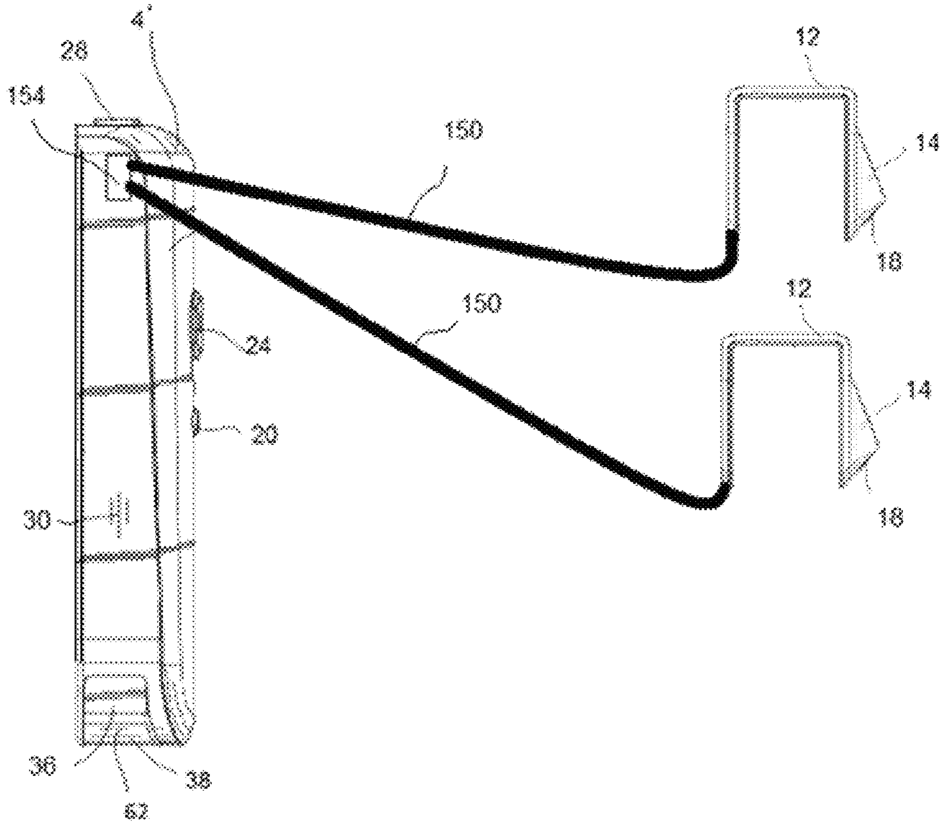
FIG. 27 shows a side view of another embodiment of a toilet refreshener as may be used in certain commercial applications.

Turning now to FIG. 27, there is shown an alternate embodiment of a toilet freshener 4'. The toilet freshener 4' may include a housing having a body 8 and a plurality of arms arm 12 which are attached to the body by tubing 150. The arms 12 may be bent for mounting on a toilet bowel as discussed previously. When the toilet freshener (either a sensor on the body 8, such as sensor 28 or a sensor on the arm (similar to sensor 17 discussed above), the fragrance spray nozzle 18 may be used to disperse fragrance into the toilet to thereby mask the odors. It will be appreciated that the body 8 may include a valve 154 to control which tubing 150 the fragrance is dispensed through based on information received from the sensor on the arm 12.

Alternatively, the body 8 may include multiple containers of fragrance and actuators similar to those discussed in previous embodiments which can be activated for the specific arm 12 to which that container/actuator is in communication. Thus, a single wall mounted body 8 may be used with multiple arms 12 to treat a number of toilets, such as in a commercial environment while still providing many of the advantages of the present disclosure. Other portions may be similar to the discussion above and are numbered accordingly.

Figure 28:
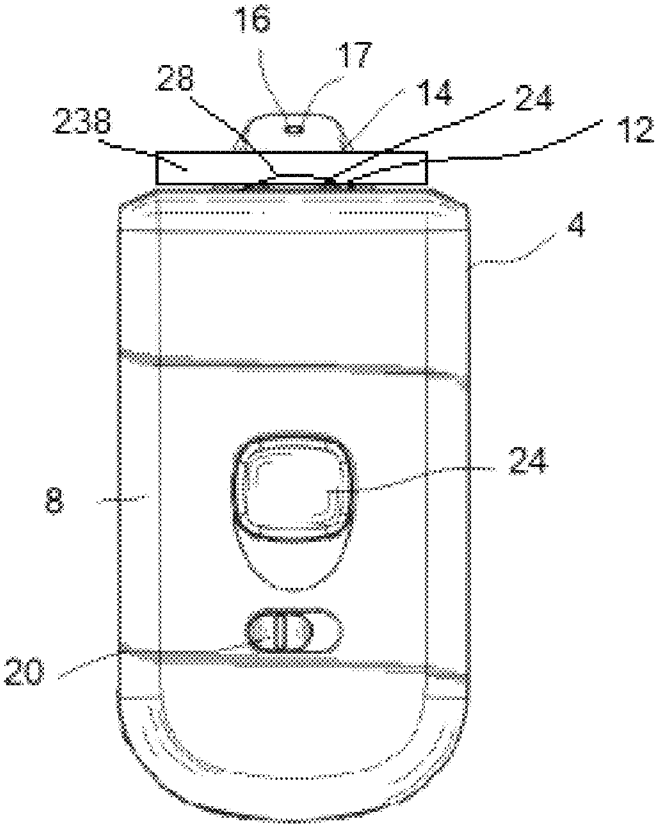
FIG. 28 shows a front view of another toilet fresheners and nightlight.

FIG. 28 shows a front view of a toilet freshener and nightlight 4. The toilet freshener and nightlight 4 may include a housing having a body 8 and an arm 12 which extends away from the body. As will be explained in additional detail below, the arm 12 may have a dispensing container 238 disposed thereon. The dispensing container 238 may be formed as a cartridge or other structure for holding a plurality of tablets or pills. A projection 14 may be disposed on the arm 12 or on the dispensing container 238 and may include a light 16 and a sensor 17. The light 16 may be used to light the interior of a toilet bowl once activated to help a person using the toilet in low ambient light conditions. The sensor 17 may be used to determine when a person has sat on the toilet seat as discussed above. The sensor may operate by emitting and detecting reflected signals—such as is commonly done with ultrasonic transducers, or by heat, sound, ambient light, pressure, capacitive touch and change in resistance.

The body 8 may include a control switch 20 which may be used to switch the freshener 4 between an automatic mode and a manual mode so as to provide a user with the ability to dispense fragrance each time the toilet is used, or to only dispense fragrance when the user presses the control switch. Also disposed on the body 8 may be one or more lights 24 to partially light the bathroom at night so that a user need not turn on the bathroom light when using the toilet.

The body 8 may include a sensor 28 which may be disposed on the top of the body 8. The sensor 28 may include a motion detector which turns on the light(s) 24 when a person is detected within a certain proximity, e.g., 5 feet of the toilet. The sensor 28 may also include an ambient light sensor so that the light 24 is not activated when the bathroom has adequate ambient light to facilitate use of the toilet without supplemental lighting.

Figure 29:
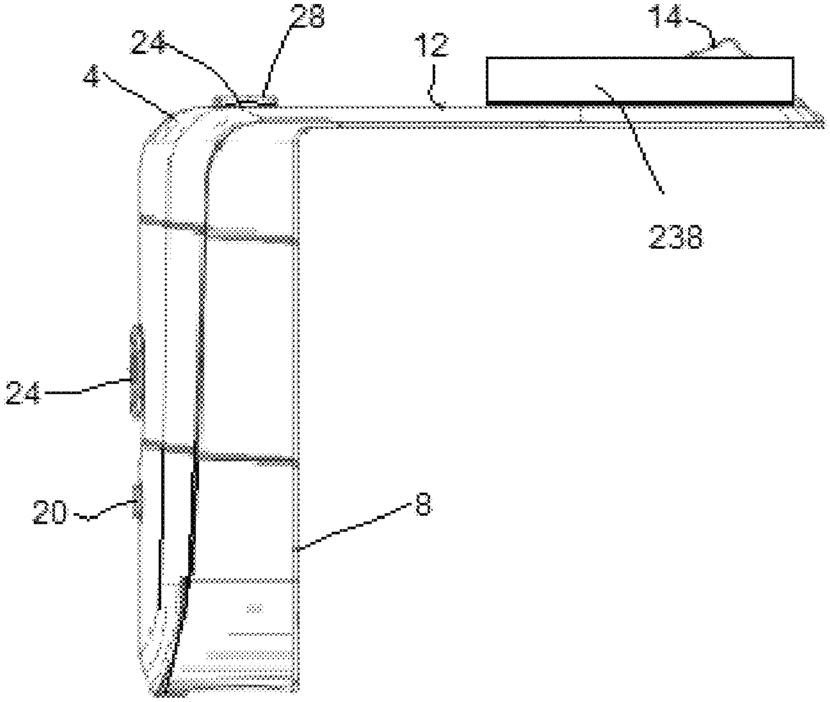
FIG. 29 shows a side view of the toilet freshener of FIG. 28.

As shown in FIG. 29, the sensor 28 may be disposed on the top of the body 8 in such a position that the sensor will not be covered or materially shielded by a toilet seat or toilet seat cover when the body 8 is attached to a toilet bowl. This enables the sensor 28 to activate the light(s) 24 in response to a person approaching the toilet from multiple directions. The body 8 may be used to hold processors for running the toilet freshener 4 and may also house a power supply, such as a plurality of batteries.

Also shown in the side view of FIG. 29, the dispensing container 238 may be disposed on the arm 12 a sufficient distance away from the body 8 to allow the arm to bend and so that the rim of a toilet bowl is held between the body and the arm. When so bent, the dispensing container 238 may be held in the toilet bowl and may dispense one or more tablets into the water when a person sits on the toilet seat. The dispensing container 238 may be fixedly attached to the arm 12 and may be refilled by the customer when the tablets have all been used. Alternatively, the dispensing container 238 may be a cartridge which selectively attaches to the arm 12, such as will a snap, hook and loop fastener (aka VELCRO) or other known attachment means. When all of the tablets are used, the cartridge can be removed from the arm and replaced with a new cartridge containing tablets.

Figure 30:
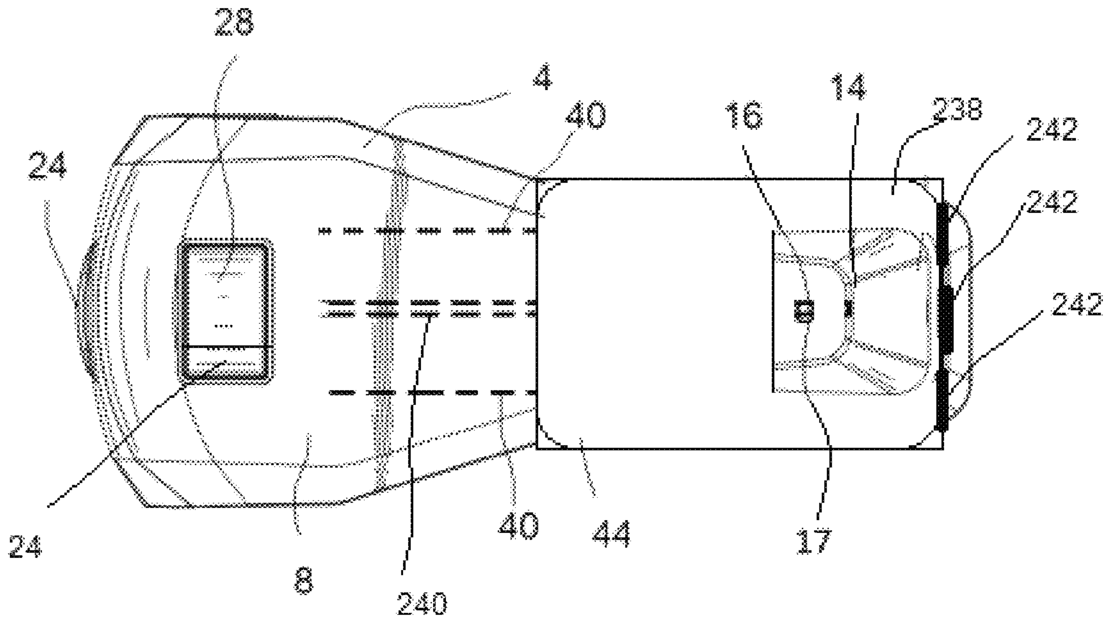
FIG. 30 shows a top view of the toilet freshener of FIG. 28.

Turning now to FIG. 30, there is shown a top view of the toilet freshener and nightlight 4 with the arm 12 in the unbent position. The body portion 8 is shown along with the lights 24 and the sensor 28. The arm 12 may have one or more bendable wires 40 covered by a flexible housing to allow the arm 12 to be bent into the desired shape to attach the device to a toilet. A power line 240 may also be disposed in arm 12 and connected to the dispensing container 238. The power line 240 may power a light 16 and sensor 17 disposed on the projection 14 (or otherwise located on the dispensing container 238 or arm 12). Additionally, the power line 240 may power one more doors 242 which uncovers one or more dispenser openings for dispensing tablets or the like from the dispensing container. Other types of actuators and dispenser may also be used. Thus, for example, when a person sits on the toilet seat, the sensor 17 may send a signal which causes one of the doors 242 to open and release a tablet into the water. The tablet may be effervescent and release deodorant or fragrance into the water to thereby mask the smell. It will be appreciated that, as an alternative to doors, conveyors, screw feeds and other types of dispensers may also be used.

Figure 31:
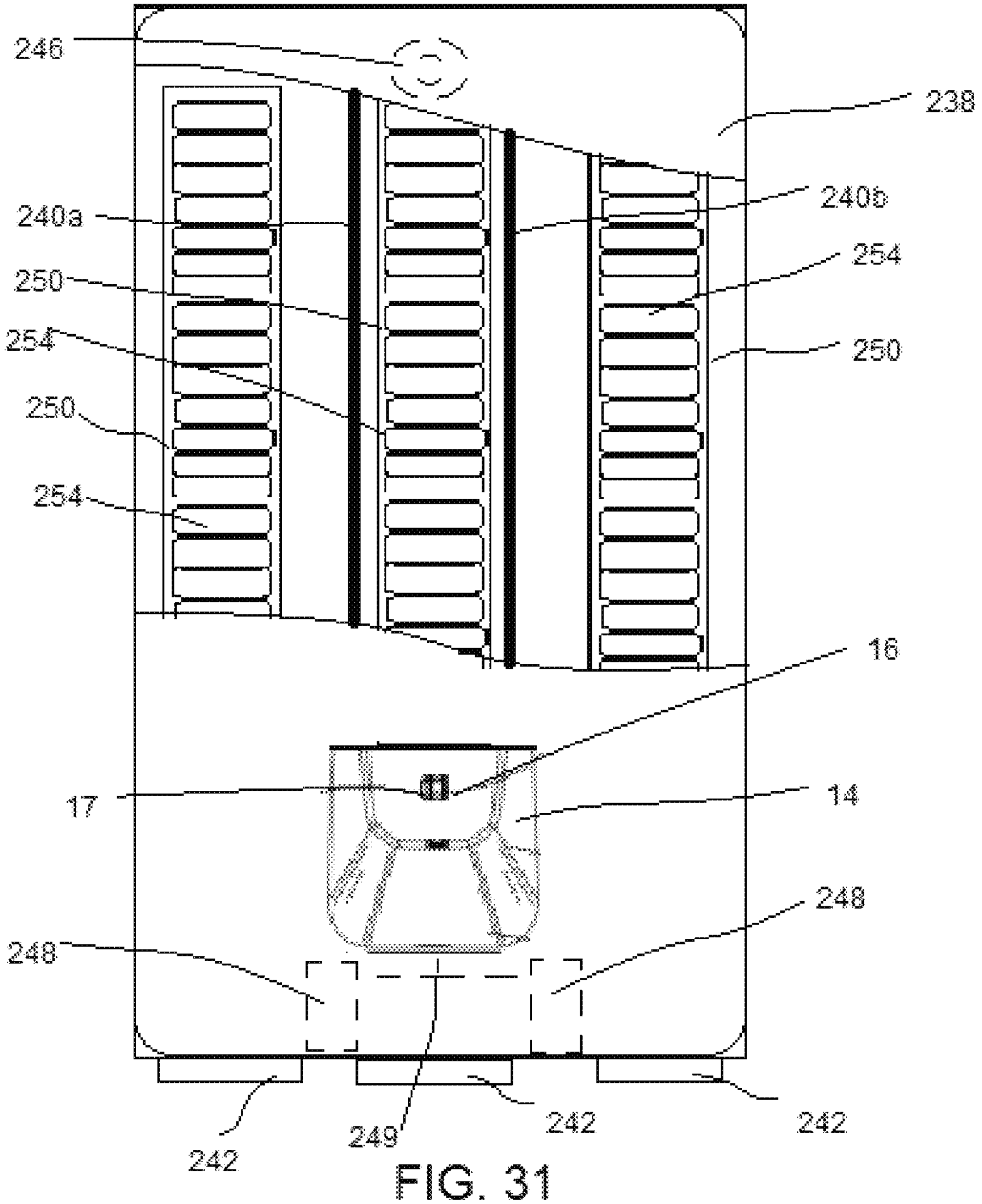
FIG. 31 shows a close-up view of a dispensing container in the form of a cartridge for use with the toilet freshener of FIG. 28.

FIG. 31 shows a top, partial cut-away view of the dispensing container which may be formed as a cartridge which uses a snap 246 or other attachment to releasably attach to the arm attach to arm. The dispensing container 238 may include a pair power wires 240*a* and 240*b*. One may power the light 16 and sensor 17 on the projection 14. The other may power one or more actuators 248 which selectively open the doors 242 when a signal is sent over a wireless protocol or a signal line 249 from the sensor 17 to the actuators 248 indicating that a person has sat on the toilet seat.

The dispensing container 238 may include one or more chambers 250 for holding tablets 254 or the like within the dispensing container. When the signal is sent from the sensor 17, one or more doors 242 may open to allow one or more tablets 254 to drop into the toilet bowl and thereby provide fragrance to mask the smell. While the dispensing container 238 could be made permanently attached to the arm 12 and the user could refill the chambers 250 with the tablets, the dispensing container can be made as a disposable cartridge which comes preloaded with the tablets.

It will be appreciated that the toilet freshener disclosed herein may come in many combinations. The toilet freshener may include a body and an arm extending from the body, the arm being sufficiently flexible to be bent so that the arm will hold the body to the side of a toilet bowl, at least one of the body and the arm having or being configured to receive a fragrance dispensing container. In one example, the toilet freshener may include one or more of the following:

- a motion sensor disposed on top of the body;
- a light which turns on when the motion sensor senses movement in low ambient light conditions;
- a light and a sensor disposed on the arm, and the sensor being activated when the motion sensor detects movement;
- the light on the arm shining light into the toilet bowl when the ambient light near the toilet freshener is below a predetermined threshold;
- the body having a void for receiving a fragrance dispensing container and a catch for engaging the fragrance dispensing container and preventing removal of the fragrance dispensing container from the body while the catch is engaging the fragrance dispensing container;
- a catch having a release disposed on the bottom of the catch such that pressing on the release moves the catch out of engagement with the fragrance dispensing container;
- a fragrance dispensing container disposed in the body, the fragrance dispensing container having a notch formed therein and a projection extending therefrom, and wherein a portion of the catch is disposed in the notch in the fragrance dispensing container;
- a release being disposed adjacent the projection, such that pressing on the release exposes a top of the projection;
- a fragrance dispensing container having a chip indicating a number of available doses in the fragrance dispensing container;
- an arm having a sensor for determining when a person is sitting on a toilet to which the toilet freshener is attached and wherein the body includes an actuator mechanism which actuates a plunger in response to a signal indicating that a person has sat on the toilet;
- a control switch for determining whether the actuator mechanism actuates the plunger automatically or manually;
- a one-way valve disposed adjacent the plunger for preventing fluids pumped into the plunger from leaving the plunger in the direction from which the fluids came;
- an actuator mechanism which includes a transmitter or a transceiver;
- a speaker and a signal generator in communication with the speaker so that the speaker emits white noise or pink noise; and/or
- a speaker and a signal generator in communication with the speaker to cause the speaker to emit noise canceling wave forms.

A toilet freshener system according to the present disclosure may include a housing having a body and an arm, the body comprising an actuator mechanism, a motion sensor for detecting movement near the body, the motion sensor being disposed on top of the body; and a void for receiving a fragrance dispensing container; the arm being bendable; and the arm being sufficiently flexible to be bent so that a portion of the arm extends approximately parallel with the body, the arm comprising a light, a sensor for determining if a person is sitting on a toilet on which the toilet freshener is mounted, and a spray nozzle for spraying fragrance into the toilet. The system may further include one or more of the following:

- a catch pivotably disposed in the housing for selectively engaging a fragrance dispensing container;
- a fragrance dispensing container disposed in the body and wherein the fragrance dispensing container comprises a notch formed therein and wherein a portion of the catch is disposed in the notch;
- the fragrance dispensing container having a projection and wherein the catch comprises a release for moving the portion of the catch disposed in the notch out of the notch, and wherein the release is disposed adjacent the projection; and/or
- a transceiver disposed within the body, and wherein the system further comprises code disposed in memory in communication with a mobile processor, the code being programmed to provided instructions to the actuation mechanism.

A toilet freshener system according to the present disclosure may include a housing having a body and a bendable arm, the body having a motion sensor for detecting movement near the body, the motion sensor being disposed on top of the body; and the arm being sufficiently flexible to be bent so that a portion of the arm extends approximately parallel with the body, the arm comprising a light, a sensor for determining if a person is sitting on a toilet on which the toilet freshener is mounted, and a dispenser for releasing fragrance into the toilet. The toilet freshener may also include one or more of the following:

- the body having a void for receiving a dispensing container and a catch pivotably disposed in the housing for selectively engaging a fragrance dispensing container to selectively maintain the fragrance dispensing container in the body;
- a dispenser opening disposed along the arm;
- the dispenser including a spray opening; and/or
- the dispenser including a dispensing container having a plurality of fragrance tablets disposed therein.

Thus, there is disclosed a toiler freshener and nightlight which can be used to make use of a toilet more comfortable. Numerous modifications to the various embodiments discussed herein will be apparent to a person of ordinary skill in the art and the appended claims are intended to cover such modifications.

What is claimed is:

1. A toilet freshener system comprising:

a housing having a body and an arm:

the body comprising a top and a bottom:

an actuator mechanism;

a motion sensor for detecting movement near the body, the motion sensor being disposed on top of the body;

a void for receiving a fragrance dispensing container; and a catch disposed in the housing for selectively engaging a fragrance dispensing container when the fragrance container is disposed in the body to selectively prevent the fragrance container from being withdrawn from the body and wherein the catch has a release disposed on the bottom of the catch such that pressing on the release moves the catch out of engagement with the fragrance dispensing container;

and the arm having a portion extending from the top of the body generally perpendicular to the body such that when the body is disposed vertically, the portion of the arm where the arm is attached to the body extends horizontally, and wherein the motion sensor extends to a position higher than the portion of the arm which extends horizontally from the body.

2. The system of claim 1, further comprising a fragrance dispensing container disposed in the body and wherein the fragrance dispensing container comprises a notch formed therein and wherein a portion of the catch is disposed in the notch.

3. The system of claim 2, wherein the fragrance dispensing container comprises a projection and wherein the release is disposed adjacent the projection.

4. The system of claim 1, further comprising a transceiver disposed within the body, and wherein the system further comprises code disposed in memory in communication with a mobile processor, the code being programmed to provide instructions to the actuation mechanism.

5. A toilet freshener system comprising:

a housing having a body and an arm:

the body comprising:

a motion sensor for detecting movement near the body, the motion sensor being disposed on top of the body;

a void for receiving a fragrance dispensing container; and a catch disposed in the housing for selectively engaging a fragrance dispensing container when the fragrance container is disposed in the body to selectively prevent the fragrance container from being withdrawn from the body and wherein the catch has a release disposed on the bottom of the catch such that pressing on the release moves the catch out of engagement with the fragrance dispensing container; and the arm extending horizontally from the top of the body with motion sensor being disposed higher than the arm as the arm it extends horizontally from the body such that when the arm is disposed on the toilet bowl the motion sensor is higher than the toilet bowl, and wherein the arm comprising a light, a sensor for determining if a person is sitting on a toilet on which the toilet freshener is mounted, and a dispenser for releasing fragrance into the toilet.

6. The system of claim 5, wherein the body has a void for receiving a dispensing container and a catch pivotably disposed in the housing for selectively engaging a fragrance dispensing container to selectively maintain the fragrance dispensing container in the body.

7. The system of claim 5, further comprising a dispenser opening disposed along the arm.

8. The system of claim 7, wherein the dispenser comprises a spray opening.

9. The system of claim 7, wherein the dispenser comprises a dispensing container having a plurality of fragrance tablets disposed therein.

10. A toilet freshener comprising:

a body and an arm extending from the body, the arm being sufficiently flexible to be bent so that the arm will hold the body to the side of a toilet bowl, at least one of the body and the arm having, or being configured to receive, a fragrance dispensing container, and a motion sensor disposed on the body the motion sensor extending above the body and the arm when the toilet freshener is mounted on a toilet bowl, wherein the body has a void for receiving a fragrance dispensing container and a catch for engaging the fragrance dispensing container and preventing removal of the fragrance dispensing container from the body while the catch is engaging the fragrance dispensing container, and wherein the catch has a release disposed on the bottom of the catch such that pressing on the release moves the catch out of engagement with the fragrance dispensing container.

11. The toilet freshener of claim 10, further comprising a light disposed on top of the body.

12. The toilet freshener of claim 11 wherein the light turns on when the motion sensor senses movement in low ambient light conditions.

13. The toilet freshener of claim 11, further comprising a light and a sensor disposed on the arm generally opposite the body, and wherein the sensor is activated when the motion sensor detects movement.

14. The toilet freshener of claim 13, wherein the light on the arm shines light into the toilet bowl when the ambient light near the toilet freshener is below a predetermined threshold.

15. The toilet freshener of claim 10, further comprising a fragrance dispensing container disposed in the body, the fragrance dispensing container having an outer wall with a notch formed therein and a projection extending therefrom, and wherein a portion of the catch is disposed in the notch in the fragrance dispensing container.

16. The toilet freshener of claim 15, wherein the release is disposed adjacent the projection, such that pressing on the release exposes a top of the projection.

17. The toilet freshener of claim 15, wherein the fragrance dispensing container has a chip indicating a number of available doses in the fragrance dispensing container.

18. The toilet freshener of claim 10, wherein the arm has a sensor for determining when a person is sitting on a toilet to which the toilet freshener is attached and wherein the body includes an actuator mechanism which actuates a plunger in response to a signal indicating that a person has sat on the toilet.

19. The toilet freshener of claim 18, further comprising a control switch for determining whether the actuator mechanism actuates the plunger automatically or manually.

20. The toilet freshener of claim 18, further comprising a one-way valve disposed adjacent the plunger for preventing fluids pumped into the plunger from leaving the plunger in the direction from which the fluids came.

21. The toilet freshener of claim 18, wherein the actuator mechanism includes a transmitter or a transceiver.

22. The toilet freshener of claim 10, further comprising a speaker and a signal generator in communication with the speaker so that the speaker emits white noise or pink noise.

23. The toilet freshener of claim 10, further comprising a speaker and a signal generator in communication with the speaker to cause the speaker to emit noise canceling wave forms.

24. A toilet freshener comprising:

an arm for mounting the toilet freshener on a toilet; and a body having a void therein for received a fragrance container and a catch disposed in the housing for selectively engaging a fragrance dispensing container when the fragrance container is disposed in the body to selectively prevent the fragrance container from being withdrawn from the body and wherein the catch has a release disposed on the bottom of the catch such that pressing on the release moves the catch out of engagement with the fragrance dispensing container to thereby allow the fragrance container to be removed from the void.

25. The toilet freshener of claim 24 further comprising a fragrance container, the fragrance container having a body with a projection disposed thereon and wherein when the fragrance container is disposed in the void in the housing the projection is disposed beneath the release such that pressing inwardly on the release and downwardly on the projection removes the fragrance container from the housing.

26. The toilet freshener of claim 25, wherein fragrance container comprises a notch extending into the fragrance container and wherein the catch comprises a pawl having a first portion which is biased into the notch when the fragrance container is disposed in the void and a second portion forming the release and wherein the second portion of the pawl is placed adjacent the projection on the fragrance container when the fragrance container is disposed in the housing.

* * * * *